United States Patent [19]
Cheetham et al.

[11] Patent Number: 6,115,694
[45] Date of Patent: *Sep. 5, 2000

[54] METHOD FOR VALIDATING SPECIFIED PRICES ON REAL PROPERTY

[75] Inventors: William Estel Cheetham, Clifton Park; Piero Patrone Bonissone, Schenectady, both of N.Y.

[73] Assignee: General Electric Company, Schenectady, N.Y.

[*] Notice: This patent is subject to a terminal disclaimer.

[21] Appl. No.: 09/118,103

[22] Filed: Jul. 17, 1998

Related U.S. Application Data

[63] Continuation-in-part of application No. 08/519,380, Aug. 25, 1995, abandoned.

[51] Int. Cl.$^7$ .................................................. G06F 17/60
[52] U.S. Cl. ............................................................ 705/10
[58] Field of Search ............................... 705/10, 30, 35, 705/36, 37, 38; 707/10, 100, 104, 200

[56] References Cited

U.S. PATENT DOCUMENTS

| | | | |
|---|---|---|---|
| 5,361,201 | 11/1994 | Jost et al. | 364/401 |
| 5,414,621 | 5/1995 | Hough | 364/401 |
| 5,680,305 | 10/1997 | Apgar, IV | 705/10 |
| 5,960,407 | 9/1999 | Vivona | 705/10 |

OTHER PUBLICATIONS

Americal Institute of Real Estate Appraisers, Apprasing Residential Property, pp. 371–436 2ed, Jul. 1994.

Avelino J. Gonsales, "A Case–Based Reasoning Approach to Real Estate Property Appraisal ", Expert Systems with Applications, v4 pp. 229–246, Year 1992.

US Patent Application, RD–24,353 "A Method for Estimating the Dollar Per Square Foot Value of Real Property According to a Set of Comparable Properties" Piero P. Bonissone & William E. Cheetam.

"A Case–Based Reasoning Approach to Real Estate Property Appraisal" By a Gonzalez, et al., pp. 229–246.

"The Sales Comparison Approach" Apraising Residential Properties (2nd Edition, 1994) pp. 371–436.

US Patent Application, RD–24,351 "A Method for Estimating the Value of Real Property" By William E. Cheetam and Piero P. Bonissone.

American Institute of Real Estate Appraisers, Appraising Residential Properties, 371–436 (2d ed.), Jul. 1994.

Avelino J. Gonzales, "A Case–Based Reasoning Approach to Real Estate Property Appraisal", Expert Systems with Applications v 4, pp. 229–246, 1992.

*Primary Examiner*—Frantzy Poinvil
*Attorney, Agent, or Firm*—David C. Goldman; Jill M. Breedlove

[57] ABSTRACT

A computer-implemented method for validating specified prices on real property. A set of real estate properties comparable to the subject property are retrieved. A measurement of similarity between each comparable property and the subject property is then determined. A plurality of adjustment rules are then applied to adjust the price of the comparable properties. The adjusted comparable properties are then extracted, sorted, and ranked, according to the specified sale price. The extracted comparable properties are then aggregated into an estimate price of the subject property. After aggregation, the estimate price of the subject property is compared to the specified price and a measurement of confidence validating the reliability of the specified price is then generated.

6 Claims, 5 Drawing Sheets

METHOD FOR VALIDATING SPECIFIED PRICES ON REAL PROPERTY

CROSS-REFERENCES TO RELATED APPLICATIONS

This is a continuation-in-part of application Ser. No. 08/519,380 filed Aug. 25, 1995, now abandoned.

This application is related in subject matter to application Ser. No. 09/118,112 filed July 17, 1998 now pending, and application Ser. No. 09/118,188 filed Jul. 17, 1998 now pending.

FIELD OF THE INVENTION

This invention relates generally to real estate appraisals and more particularly to a method for validating specified prices on real property.

Real estate appraisals are used to estimate the defined value of a real property interest in real estate. The appraisals have use in many types of real estate transactions. For example, a buyer may use an appraisal to find out a property's market value before accepting a selling price, a seller may use an appraisal to determine a selling price, an insurer may use an appraisal before underwriting a mortgage loan, or a lender may use an appraisal to acquire certain information about a property before issuing a loan for that property. A problem with appraisals is that they can take a lot of time (i.e. about four days) to complete, which may be too long in many real estate transactions. For example, in the scenario of a lender determining whether to issue a loan to a buyer who has agreed to a specified price with a seller, the lender will provide the appraiser with the location of the subject property (i.e., the real property to be appraised) and the specified price and request that an appraisal report be prepared as soon as possible. The appraisal takes about four days because the appraiser needs to inspect the subject property, find recent sales that are comparable to the subject property, determine the comparables which are the most relevant to the subject property, adjust the sales prices of the most relevant comparables to reflect their differences from the subject property, reconcile the adjusted sales prices to derive a single value estimate of the subject property, and then decide whether the specified price is a valid price. In many cases a full appraisal is not needed. In these cases, all that is required is a determination of whether the specified price is a reasonable value for the subject property. Presently, there are no approaches that determine if the specified price is reasonable. Therefore, there is a need for a method that determines whether specified prices on real property interests are reasonable.

SUMMARY OF THE INVENTION

Thus, in accordance with the present invention, there is provided a computer-implemented method for validating a specified price on a subject property. The computer-implemented method comprises retrieving a set of real estate properties comparable to the subject property from a case base. The comparable real estate properties and the subject property are characterized by a plurality of common attributes each having a respective value. Each attribute value from the set of comparable properties is evaluated to the same attribute value of the subject property on a fuzzy preference scale indicating desirable and tolerable deviations from an ideal match with the subject property. Each evaluation generates a preference vector having a value between 0 and 1. A measurement of similarity between each comparable property and the subject property is then determined. Additional attributes characterizing the comparable properties are then examined with the subject property. Next, the present invention determines the differences between the additional attributes characterizing each of the comparable properties and the subject property. A plurality of adjustment rules from an adjustment rule database are then applied to the differences between each of the comparable properties and the subject property. The plurality of adjustment rules adjust the price of the comparable properties by either decreasing the price of each comparable property if the comparable property has differences in the additional characteristics that are superior in value to the subject property or increasing the price of each comparable property if the comparable property has differences in additional characteristics that are inferior in value to the subject property. The adjusted comparable properties are then extracted according to a predetermined threshold. The adjusted comparable properties are then sorted and ranked according to similarity with the specified price. The sorted and ranked comparable properties are then extracted. The extracted comparable properties are then aggregated into an estimate price of the subject property. After aggregation, the estimate price of the subject property is compared to the specified price and a measurement of confidence validating the reliability of the specified price is then generated.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE INVENTION

Figure 1:
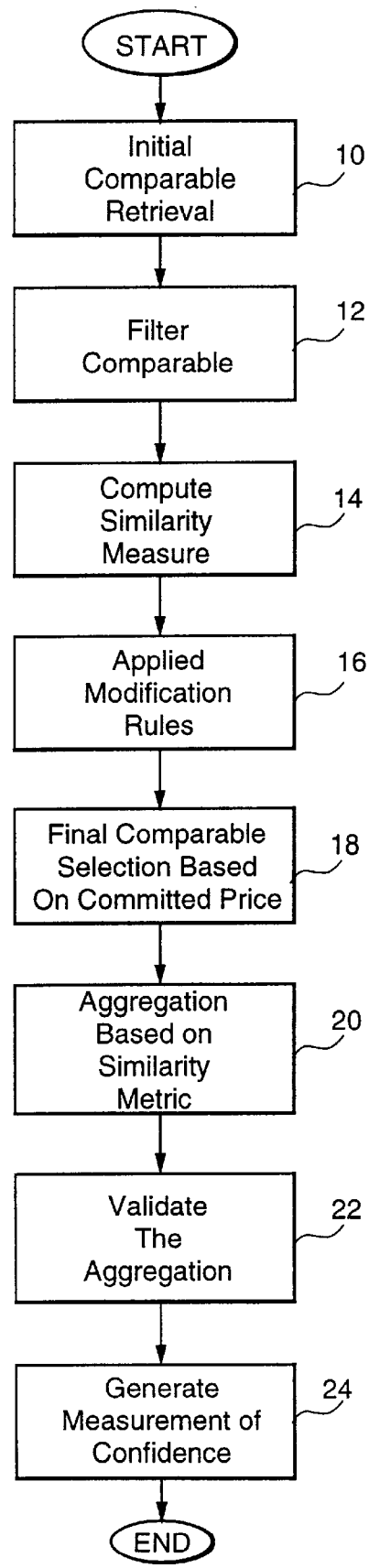
FIG. 1 is a flow chart describing the steps of validating specified prices on real property according to this invention.

This invention validates the specified price of a subject property by using case-based reasoning principles. In particular, case-based reasoning is used to automate the steps of finding recent sales comparable to the subject property, determining the most relevant units of comparison, comparing the subject property with the comparables, adjusting the sales price of the comparables to reflect the differences from the subject, and reconciling the adjusted sales prices of the comparables to derive an estimate of the subject. FIG. 1 is a flow chart describing the steps of validating specified prices on real property according to this invention. In FIG. 1, an initial set of real estate properties that are comparable to the subject property are retrieved at 10. The initial set of comparable properties and the subject property are both characterized by a plurality of common attributes each having a respective value. The attributes include transaction characteristics such as location of the property, date of sale of the property, sale price of the property, the living area, the lot size, the number of bedrooms, and the number of bathrooms. Although the illustrative embodiment is described with reference to these attributes, it is within the scope of this invention to use other attributes such as type of construction of the property, parking spaces, location influence of the property, type of construction of the property, foundation of the property, the roof type and roof cover of the property, garage or carport, style of the property, etc. The number of comparable properties are filtered at 12 to reduce the number of potential comparables. Each attribute value from the filtered comparable properties is then evaluated to the same attribute value of the subject property and a measure of similarity is then generated at 14. The price of each of the comparable properties is then adjusted at 16 to the value of the subject property by applying a set of modification rules. The modification rules evaluate additional characteristics between the comparable properties and the subject property and adjust the price of the property accordingly. In the illustrative embodiment, the additional characteristics are the number of fireplaces, pools, the effective age of the properties, the quality of the properties, and the condition of the properties. After price adjustment, a smaller set of more closely related comparable real estate properties is then extracted at 18. The extracted comparable properties are then aggregated at 20 into an estimate price of the subject property. After the estimate price has been generated, the price is compared to the specified price to determine if it is a valid price. A measurement of confidence indicating the reliability of the validation is then generated at 24.

Figure 2:
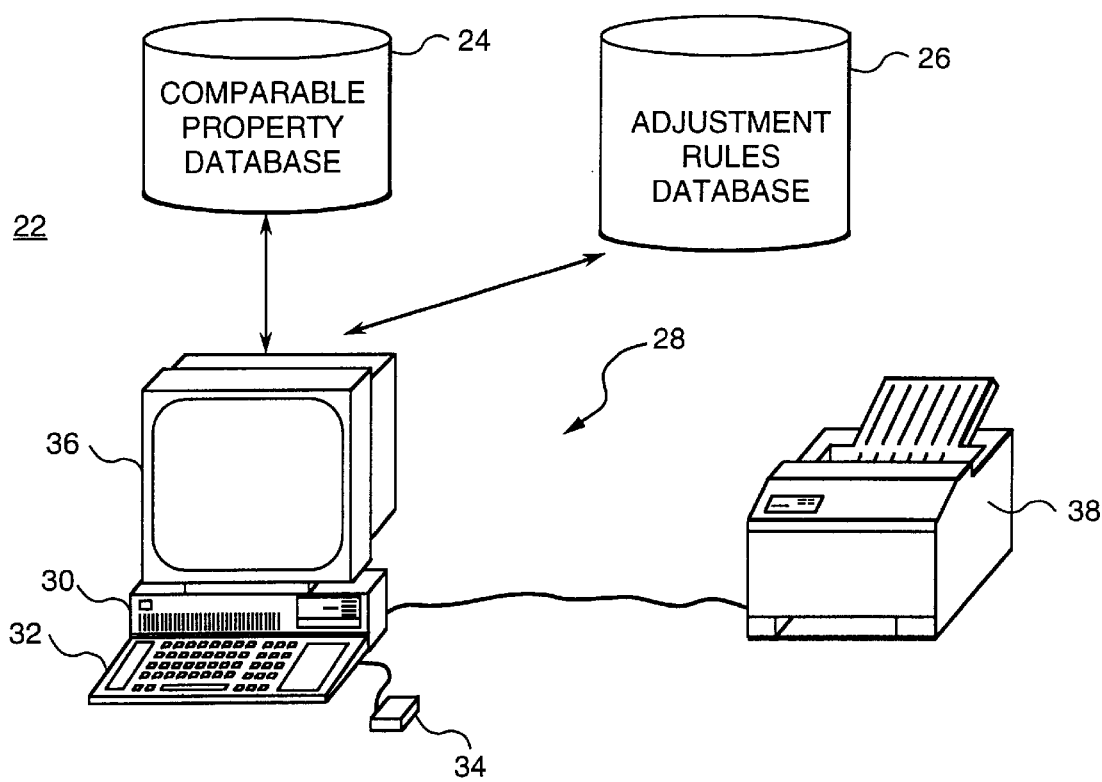
FIG. 2 is a system for validating specified prices on property according to this invention.

FIG. 2 shows a system 26 for validating specified prices on property according to this invention. The system 26 includes a comparable property database 28, which is preferably a case base having a plurality of properties. The system 26 also includes an adjustment rules database 30 containing rules for adjusting the prices of the comparable properties in the comparable property case base 28. A personal computer or work station 32 having a hard drive 34, an input device such as a keyboard 36 and a mouse 38, and an output device such as a display 40 and a printer 42, is connected to the case base 28 and the database 30. The computer 32 uses SQL queries to retrieve the comparable properties from the case base 28 and performs a series of case adaptation operations to the properties according to the adjustment rules.

Figure 3:
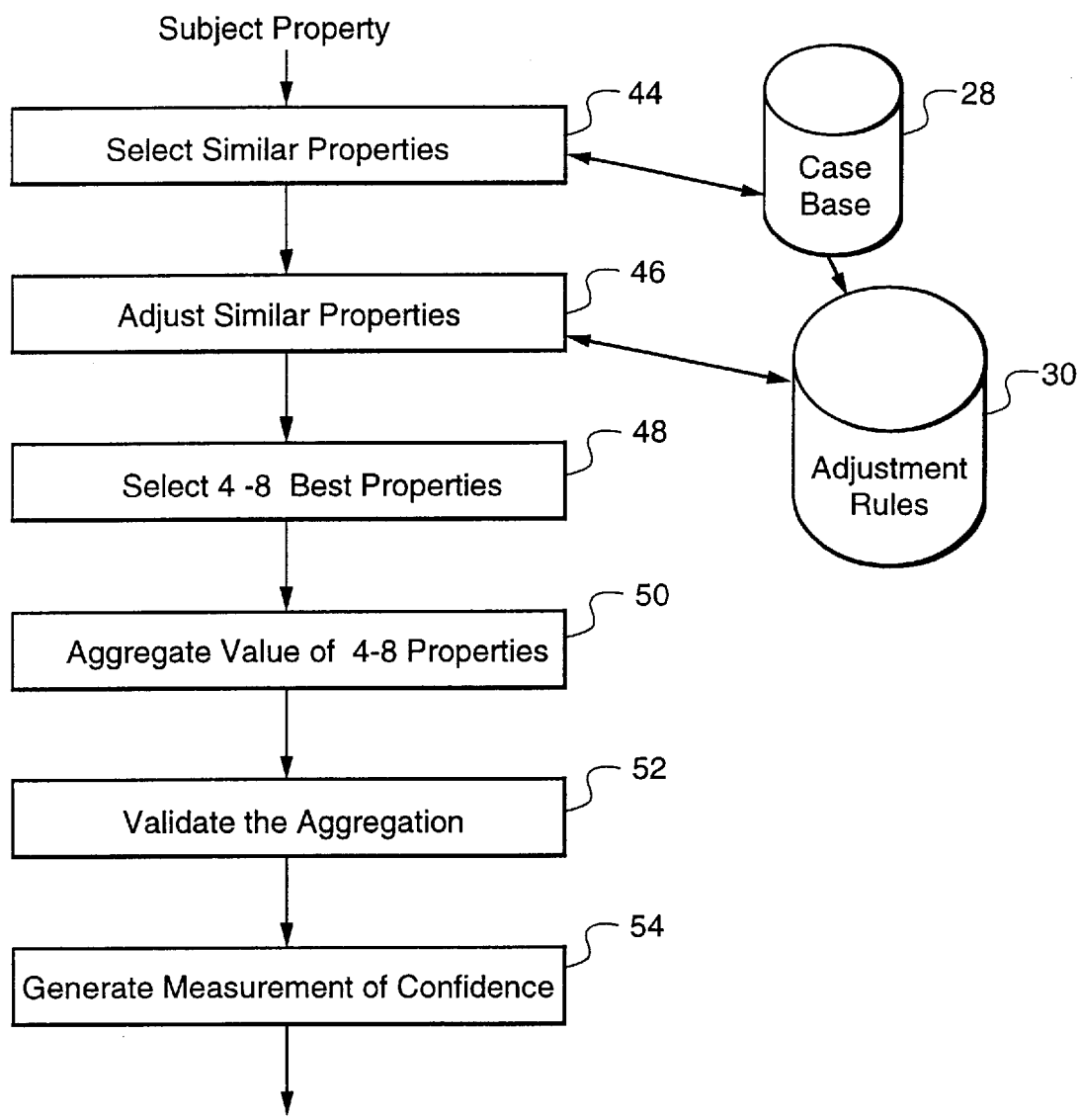
FIG. 3 is a flow diagram illustrating the operations performed in the system shown in FIG. 2.

The case retrieval and case adaptation operations are shown in further detail in the flow diagram of FIG. 3. After information about the subject property has been acquired, similar comparable real estate properties are selected at 44 from the case base 28. In the illustrative embodiment, the case base 28 contains about 600,000 real estate properties, with each property being characterized by about 166 attributes. Typically, the selection at 44 returns anywhere from four to one hundred comparable properties. The selection is performed by comparing specific attributes (i.e., location, date of sale, sale price, living area, lot size, number of bedrooms, and number of bathrooms) of the subject property with the same attributes of each comparable properties. All of the retrieved potential comparable properties have values that are within allowable deviations for the subject property. If the size of the comparable set of properties is too small (e.g., less than 10), then the allowable deviations can be adjusted so that more comparables of lesser quality can be obtained.

After the initial set of comparable properties has been retrieved, each of the values for the attributes (i.e., location, date of sale, sale price, living area, lot size, number of bedrooms, and number of bathrooms) are evaluated against the same attributes of the subject property on a fuzzy preference scale that indicates desirable and tolerable deviations from an ideal match. For example, in the illustrative embodiment, the maximum allowable deviations for the attributes are within one mile for the location attribute, 12 months for the date of sale attribute, plus or minus 25% for the sale price attribute, plus or minus 25% for the living area attribute, plus 100% or minus 50% for the lot size attribute, plus or minus two percent for the number of bedrooms attribute, and plus or minus two percent for the number of bathrooms attribute. After each attribute is evaluated, a preference vector having a value between 0 and 1 inclusive, is generated, with 1 being the best value. These values represent the partial degree of membership of each attribute value in the fuzzy sets and fuzzy relations representing the preference criteria provided in the fuzzy preference scales.

Figure 4:
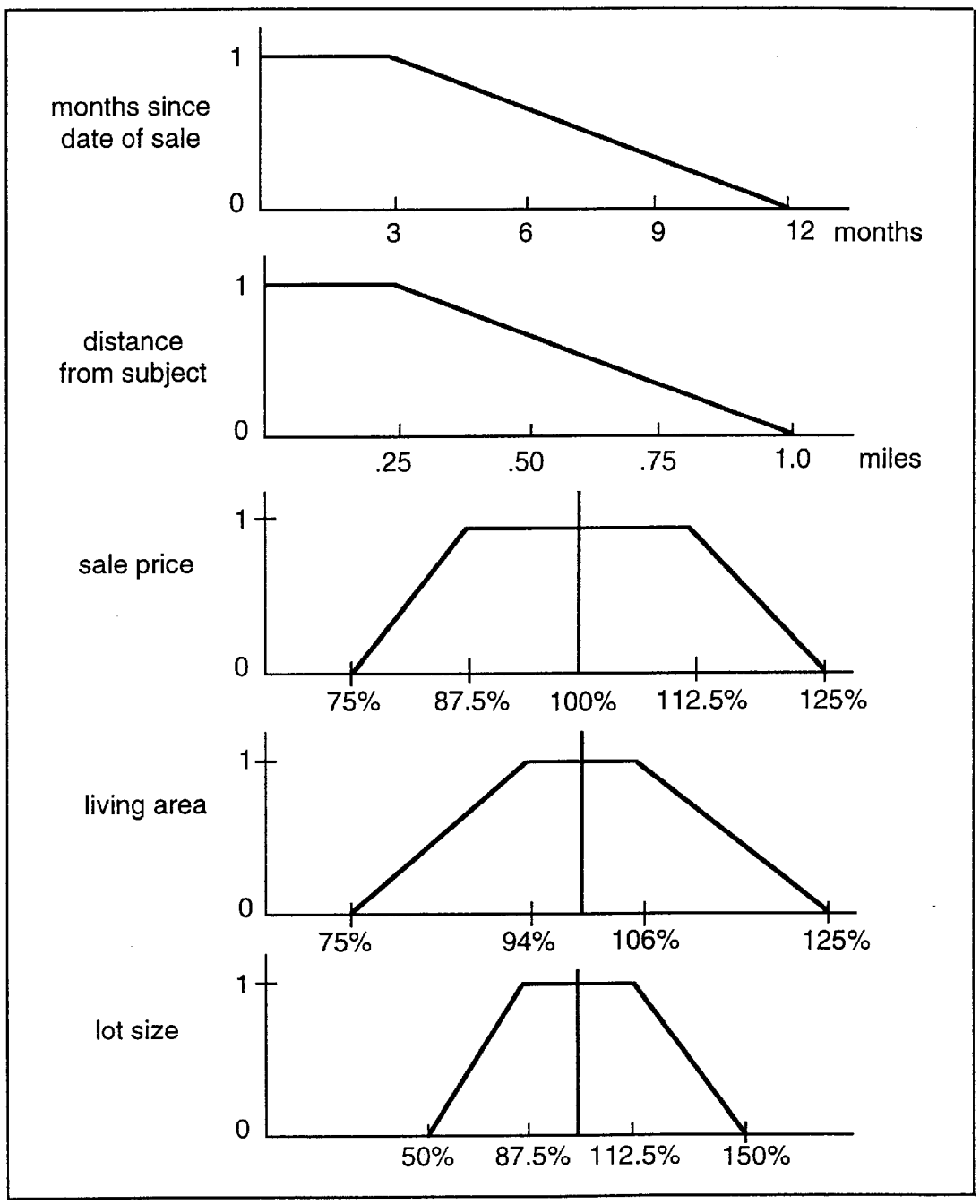
FIG. 4 is a graphical display illustrating the preference criteria used in this invention.

An understanding of the above preference criteria for the first five attributes (i.e., the date of sale, the distance from subject property, the sale price, the living area, and the lot size) is graphically described in FIG. 4. Each of the attributes in FIG. 4 have a trapezoidal shape representing its criteria evaluation functions. For each attribute, the broader base of the trapezoidal shape represents the range of tolerable values and corresponds to the interval-value used in the preliminary retrieval query. The smaller top or core of the trapezoidal shape represents the most desirable range of values and establishes the top preference for the attribute. An attribute value falling inside the most desirable region will receive a preference value of 1. As the feature value moves away from the most desirable range, its associated preference value will decrease from 1 to 0. At the end of this evaluation, each comparable will have a preference vector, with each element taking values in the [0,1] interval. These values represent the partial degree of membership of each attribute value in the fuzzy sets and fuzzy relations representing the preference criteria provided in the fuzzy preference scales. Typically, comparable properties selected in the preliminary retrieval that have attribute values falling outside the tolerable value range will not be evaluated.

In the illustrative embodiment, the preference distribution for the date-of-sale attribute for a comparable property that was sold within three months of the present date is 1. If the date of sale of the comparable property was 6 months ago, its preference value will be 0.67. If the date of sale of the comparable property was 9 months ago, its preference value will be 0.33. Any comparable property with a date of sale of more than 12 months is given a preference value of zero. For the distance from the subject property attribute, comparable properties located within 0.25 miles from the subject property have a preference value of 1. If the comparable property is located a half of a mile from the subject property, then its preference value will be 0.67. If the comparable property is located three quarters of a mile from the subject property, then its preference value will be 0.33. Any comparable property located more than one mile from the subject property is given a preference value of zero. For the sale price attribute, a comparable property having a sale price that is within 87.5% to 112.5% of the specified price of the subject property or a price provided by another estimator has a preference value of 1. If the comparable property has a sale price that is within 87.5% to 75% or within 112.5% to 125% of the specified price of the subject property or the sale price provided by another estimator, then the comparable property is given a preference value between zero and 1. If the comparable property has a sale price that is less than 75% or greater than 125% of the specified price of the subject property or the price provided by another estimator, then the comparable property is given a preference value of zero. For the living area attribute, a comparable property having a living area that is within 94% to 106% of the living area of the subject property will have a preference value of 1. If the comparable property has a living area that is within 75% to 94% or within 106% to 125% of the living area of the subject property, then the comparable property is given a preference value between zero and 1. If the comparable property has a living area that is less than 75% or greater than 125% of the living area of the subject property, then the comparable property is given a preference value of zero. For the lot size attribute, a comparable property having a lot size that is within 87.5% to 112.5% of the lot size of the subject property will have a preference value of 1. If the comparable property has a lot size that is within 50% to 87.5% or within 112.5% to 150% of the lot size of the subject property, then the comparable property is given a preference value between zero and 1. If the comparable property has a lot size that is less than 50% or greater than 150% of the lot size of the subject property, then the comparable property is given a preference value of zero. The tolerable and desirable ranges of values for the five attributes are illustrative of possible values for use with this invention and are not intended to be limiting.

The remaining two attributes not shown in FIG. 4, the number of bedrooms and the number of bathrooms, have preference functions which are illustrated in Tables 1 and 2, respectively. For example, if the subject property has five bedrooms, then Table 1 will provide a preference value of 1 for comparable properties having five bedrooms. However, if the comparable property has six or more bedrooms, then the comparable will be given a preference value of 0.80. Also, Table 1 indicates that a comparable property having four bedrooms will have a preference value of 0.60, three bedrooms will have a preference value of 0.50, and two or less bedrooms will receive a preference value of zero.

TABLE 1

Preference Functino for Number of Bedrooms

|  |  | Comparable's # Bedrooms | | | | | |
|---|---|---|---|---|---|---|---|
|  |  | 1 | 2 | 3 | 4 | 5 | 6+ |
| Subject's | 1 | 1.00 | 0.50 | 0.05 | 0.00 | 0.00 | 0.00 |
| # Bedrooms | 2 | 0.20 | 1.00 | 0.50 | 0.05 | 0.00 | 0.00 |
|  | 3 | 0.05 | 0.30 | 1.00 | 0.60 | 0.05 | 0.00 |
|  | 4 | 0.00 | 0.05 | 0.50 | 1.00 | 0.60 | 0.20 |
|  | 5 | 0.00 | 0.00 | 0.05 | 0.60 | 1.00 | 0.80 |
|  | 6+ | 0.00 | 0.00 | 0.00 | 0.20 | 0.80 | 1.00 |

Table 2 can be used in a similar manner to generate preference functions for the number of bathrooms attribute. For example, if the subject property has 2 bathrooms, then Table 2 will provide a preference value of 1 for comparable properties having two bathrooms. However, if the comparable property has two and a half bathrooms, then the comparable will be given a preference value of 0.70. Also, Table 2 indicates that a comparable property having three bathrooms will have a preference value of 0.25, three and half bathrooms will have a preference value of 0.05, four or more bathrooms will have a preference value of zero. In addition, Table 2 indicates that a comparable property having one and a half bathrooms will have a preference value of 0.70 and one bathroom will have a preference value of 0.1.

TABLE 2

Preference Function for Number of Bathrooms

|  | Comparable | | | | | | | | |
|---|---|---|---|---|---|---|---|---|---|
| Subject | 1 | 1.5 | 2 | 2.5 | 3 | 3.5 | 4 | 4.5 | 5+ |
| 1 | 1.00 | 0.75 | 0.20 | 0.05 | 0.01 | 0.00 | 0.00 | 0.00 | 0.00 |
| 1.5 | 0.60 | 1.00 | 0.60 | 0.25 | 0.10 | 0.05 | 0.00 | 0.00 | 0.00 |
| 2 | 0.10 | 0.70 | 1.00 | 0.70 | 0.25 | 0.05 | 0.00 | 0.00 | 0.00 |
| 2.5 | 0.05 | 0.20 | 0.75 | 1.00 | 0.75 | 0.20 | 0.05 | 0.00 | 0.00 |
| 3 | 0.01 | 0.10 | 0.40 | 0.80 | 1.00 | 0.80 | 0.40 | 0.10 | 0.05 |
| 3.5 | 0.00 | 0.05 | 0.15 | 0.45 | 0.85 | 1.00 | 0.85 | 0.45 | 0.30 |
| 4 | 0.00 | 0.00 | 0.05 | 0.20 | 0.50 | 0.90 | 1.00 | 0.90 | 0.70 |
| 4.5 | 0.00 | 0.00 | 0.00 | 0.10 | 0.30 | 0.70 | 0.95 | 1.00 | 0.95 |
| 5+ | 0.00 | 0.00 | 0.00 | 0.05 | 0.15 | 0.35 | 0.75 | 0.95 | 1.00 |

After each attribute of the comparable real estate properties has been evaluated against the subject property and a preference vector has been generated, the measurement of similarity between each comparable and the subject property is determined. The measurement of similarity is a function of the preference vector computed above and of the priorities of the attributes, which are reflected by a set of predetermined weights. The predetermined weights for the illustrative embodiment are shown in Table 3 under the weight column. In the illustrative embodiment, the living area attribute has a weight of 0.3, the date of sale and distance attributes both have a weight of 0.2, the price and lot size attributes have a weight of 0.1, while the number of bedrooms and bathrooms attributes have a weight of 0.05.

The measurement of similarity for a comparable property is determined by multiplying the predetermined weight by the preference vector generated for each attribute. This product results in a weighted preference value. After all of the weighted preference values have been determined, the weighted preferences are summed together to generate the measurement of similarity. An example of a measurement of similarity computation between a comparable property and a subject property is provided in Table 3. In the example provided in Table 3, the subject property has a price of $200,000, a living area of 2000 square feet, a lot size of 20,000 square feet, three bedrooms, and two and a half bathrooms. The comparable property was sold six months ago, is located 0.2 miles from the subject property, sold for $175,000, has a living area of 1800 square feet, a lot size of 35,000 square feet, three bedrooms and two bathrooms. A comparison between the subject property and the comparable property is provided in the fourth column for each attribute. In Table 3, the price comparison is 87.50%, the living area comparison is 90%, the lot size comparison is 175%, and the number of bedroom comparison is 0%. As described above, each comparison results in a preference which is multiplied by the predetermined weight. The weighted preferences for each attribute for the comparable property are listed in the weighted preference column and the measurement of similarity is the sum of the weighted preferences. In Table 3, the measurement of similarity for this particular comparable property is 0.7915.

TABLE 3

Similarity Measurement Computation

| Attribute | Subject | Comparable | Comparison | Preference | Weight | Weighted Preference |
|---|---|---|---|---|---|---|
| Date of Sale | x | 6 months | 6 months | 0.67 | 0.2 | 0.134 |
| Distance | x | 0.2 miles | 0.2 miles | 1 | 0.2 | 0.2 |
| Living Area | 2000 | 1800 | 90% | 0.79 | 0.3 | 0.237 |
| Lot Size | 20000 | 35000 | 175% | 0.33 | 0.1 | 0.033 |
| Sale Price | 200000 | 175000 | 88% | 1 | 0.1 | 0.1 |
| # Bedrooms | 3 | 3 | 3->3 | 1 | 0.05 | 0.05 |
| # Bathrooms | 2.5 | 2 | 2.5->2 | 0.75 | 0.05 | 0.0375 |
| Similarity | | | | | | 0.7915 |

Figure 5:
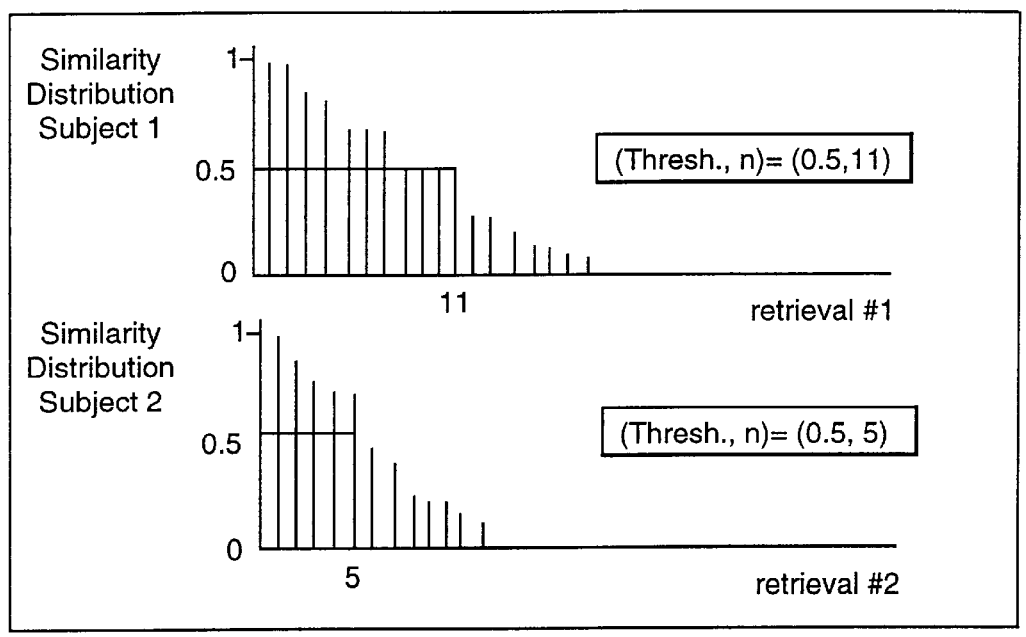
FIG. 5 is an example of a similarity distribution for a set of comparable properties.

After the measurement of similarities have been computed for all of the comparable properties, the comparables are then sorted in decreasing order of similarity. After sorting, the comparables are arranged in a preference distribution as shown in FIG. 5, with the comparable property having the highest measurement of similarity placed at one end of the distribution and the comparable property having the lowest measurement of similarity placed at the opposite end of the distribution. The comparable properties are then compared against a predetermined threshold that reflects desirable and tolerable deviations of an ideal match with the subject property. More specifically, the comparable properties that have a measurement of similarity above the predetermined threshold will be extracted for further review, while the comparable properties below the threshold are removed from further consideration. FIG. 5 shows two possible similarity distributions for two different retrievals. In these distributions, a value of 0.5 is used as the predetermined threshold. Therefore, comparable properties having a measurement of similarity above 0.5 are extracted for further review, while the comparables with measurements of similarities less than 0.5 are removed and no longer considered. In FIG. 5, retrieval number one has 11 comparable properties having a measurement of similarity above 0.5, while retrieval number two has five comparable properties with a measurement of similarity above 0.5.

Instead of using a predetermined threshold to determine which retrieval provides the best results, an alternative approach is to take the average of the similarity values of the retrieved comparables. This corresponds to the area under the curve of the distributions and is determined by taking the average measurement of similarity. For example, the average similarity measure for retrievals one and two in FIG. 5 would be determined as follows:

Average Similarity Measure Subject 1 (from best 8 comps):
(1+1+0.85+0.8+0.7+0.7+0.7+0.5)/8=0.78125

Average Similarity Measure Subject 2 (from best 8 comps):
(1+0.9+0.8+0.7+0.7+0.4+.035+0.25)/8=0.6375

Referring again to FIG. 3, the comparable properties that have been selected for further review at 44 are then adjusted to reflect the value of the subject property at 46. In particular, any difference between the subject property and the comparable properties that would cause the comparables to be more or less valuable than the subject property will require an adjustment. Thus, if a comparable property is superior to the subject property, then an adjustment is needed to decrease the price of the comparable. However, if the comparable property is inferior to the subject property, then an adjustment is needed to increase the price of the comparable.

The adjustments to the price of the comparable properties are performed by using a plurality of adjustment rules stored in the adjustment rule database 30. The adjustment rules are generated from the plurality of attributes stored in the case base 28 for all of the comparable properties. As mentioned earlier, there are approximately 166 attributes available for the subject property and the comparable properties in the illustrative embodiment. A illustrative listing of the attributes are presented below. The attributes described with a # are numeric and the remaining attributes are textual. The numeric attributes are described with a number and the textual attributes are described with text. For example, the attribute total room is described with a number such as three, four, or the like, and the pool attribute is described with a text format such as indoor, spa, etc.

| | |
|---|---|
| Recording Date | YYMMDD |
| SalePrice | # in hundreds |
| SaleCode | (Verified, Full, Unconfirmed, Approximate, Partial, Confirmed, Non-valid) |
| SFRTotalRooms | # |
| SFRFullBaths | # |
| SFRHalfBaths | # (number of half baths) |
| SearchableBaths | # Full + Half Baths (1 full + 1 half = 2 baths) |
| SFRFireplaces | # |
| SFRStyle | (coloniAl, Bungalow, Cape, D—contemporary, E—ranch, F—tudor, G—mediterranian, H—georgian, I—high ranch, J—victorian, K—conventional, L—a frame) |
| SFRBedrooms | # |
| Pool | (C—pool/spa, E—enclosed, Z—solar, H—heated, I—indoor, P—pool, S—spa, V—vinal) |
| LotArea | # (sq ft) |
| BuildingArea | # |
| NumberOfUnits | # |
| NumberOfStories | #/10 (0.15 = 1.5 stories) |
| ParkingSpaces | # |
| LocationInfluence | (A—positive view, B—ocean, C—bay front, D—canal, E—river, F—lake/pond, G—wooded, H—golf, I—corner lot/sound, J—corner, K—cul-de-sac, L—greenbelt, N—negative) |
| TypeOfConstruction | (A—frame, B—concrete, C—masonry, D—brick, E—stone, F—concrete block, G—manufact, H—metal, I—others, J—adobe, K—dome, L—log, M—special, N—heavy, O—light, S—steel) |
| Foundation | (C—concrete, S—slab, L—mud sill, M—masonry, P—piers, R—crawl/raised) |
| YearBuilt | # 19XX |
| EffectiveYearBuilt | # 19XX |
| Quality | (Average, Excellent, Fair, Good, Poor, Luxury) |
| Condition | (Average, Excellent, Fair, Good, Poor, None) |
| AirCondition | (Central, Evaporative, Heat pump, WaLl, None, Office only, Partial, Window, Yes, Z-chill water) |
| Heating | (A—gravity, B—forced air, C—floor furnace, D—wall furnace, E—hot water, F—ele bboard, G—heat pump, H—steam, I—radiant, J—space |

-continued

| | |
|---|---|
| | heater, K—solar, L—none, P—partial, Y—yes, Z—Central) |
| ParkingType | (A—Attached, B—built in, C—carport, D—detached, E—basement, F—off-site, G—open, H—none, J—finished, K—covered, P—paved, Q—adequate, R—roof, S—subterranean, U—unimproved, Y—yes, Z—garage) |
| BasementArea | # |
| RoofType | (A—arched, F—flat, G—gable, H—hip, M—mansard, T—truss-jois) |
| RoofCover | (A—mood shingles, B—mood shake, C—composite shingle, D—asbestos, E—built up, F—tar+gravel, G—slate, H—rock+gravel, I—tile, J—other, R—roll, S—steel, Y—concrete) |
| Frame | (C—concrete, S—steel, M—masonry, W—wood) |
| GarageCarportSqFt | # |
| latitude | # |
| longitude | # |

Based on these attributes, the following adjustment rules are generated in the case base 28 and stored in the adjustment rule database 30.

RecordingDate none
SalePrice
SaleCode ?
   SFRTotalRooms none
SFRTotalBaths see Table 4

TABLE 4

Adjustment Function for Number of Bathrooms

| Subject | Comp | | | | | | | | |
|---|---|---|---|---|---|---|---|---|---|
| | 1 | 1.5 | 2 | 2.5 | 3 | 3.5 | 4 | 4 | 5+ |
| 1 | 0.00 | −1.50 | −3.00 | −5.00 | −8.00 | N/A | N/A | N/A | N/A |
| 1.5 | 1.00 | 0.00 | −1.00 | −3.50 | −6.00 | −9.00 | N/A | N/A | N/A |
| 2 | 4.00 | 1.50 | 0.00 | −2.25 | −4.00 | −6.50 | N/A | N/A | N/A |
| 2.5 | 7.00 | 4.50 | 2.00 | 0.00 | −2.00 | −4.50 | −7.00 | N/A | N/A |
| 3 | 9.00 | 6.50 | 3.00 | 2.00 | 0.00 | −2.50 | −5.00 | −7.50 | '@*-5 |
| 3.5 | N/A | 8.50 | 6.50 | 4.50 | 2.50 | 0.00 | −3.00 | −5.50 | '@*-5 |
| 4 | N/A | N/A | 8.50 | 7.00 | 5.50 | 3.00 | 0.00 | −3.00 | '@*-5 |
| 4.5 | N/A | N/A | N/A | 10.00 | 8.00 | 6.00 | 3.00 | 0.00 | '@*-5 |
| 5+ | N/A | N/A | N/A | '@*-5 | '@*-5 | '@*-5 | '@*-5 | '@*-5 | 0.00 |

In order to accommodate for even more or less bathrooms, Table 4 takes the difference between the subject property and the comparable property (i.e., @) and multiplies the difference by five. For example, if the subject property has seven bathrooms and the comparable has three, then the adjustment would be 20 ([7−3]*5). If the subject property has three bathrooms and the comparable has seven, then the adjustment would be −20 ([7−3]*−5).

SFRFireplaces (subject-comp)*2000
SFRStyle ?
SFRBedrooms see Table 5

TABLE 5

Adjustment Function for Number of Bedrooms

| Sub-ject | Comp | | | | | |
|---|---|---|---|---|---|---|
| | 1 | 2 | 3 | 4 | 5 | 6+ |
| 1 | 0.00 | 0.00 | −3.50 | N/A | N/A | N/A |
| 2 | 0.00 | 0.00 | 0.00 | −2.50 | N/A | N/A |
| 3 | 4.00 | 0.00 | 0.00 | 0.00 | −4.00 | N/A |
| 4 | N/A | 4.00 | 0.00 | 0.00 | 0.00 | '(@-1)*3.5 |

TABLE 5-continued

Adjustment Function for Number of Bedrooms

| Sub-ject | Comp | | | | | |
|---|---|---|---|---|---|---|
| | 1 | 2 | 3 | 4 | 5 | 6+ |
| 5 | N/A | N/A | 4.00 | 0.00 | 0.00 | '(@-1)*3.5 |
| 6+ | N/A | N/A | N/A | '(@-1)*3.5 | '(@-1)*3.5 | 0.00 |

In order to accommodate for even more or less bedrooms, Table 5 takes the difference between the subject property and the comparable property (i.e., @) and subtracts the difference by one and multiplies the difference by 3.5. For example, if the subject property has six bedrooms and the comparable has four, then the adjustment would be 3.5[[(6−4)−1]*3.5]. If the subject property has four bedrooms and the comparable has six, then the adjustment would be −3.5[[(6−4)−1]*−3.5].

| | |
|---|---|
| Pool | $10000 for a pool |
| LotArea | (subject - comp) |
| BuildingArea | (subject - comp) * (22 + (sales_price_closing_of_comp * .00003)) |

-continued

| | |
|---|---|
| NumberOfUnits | ? |
| NumberOfStories | ? |
| ParkingSpaces | ? |
| LocationInfluence | no adjustment between comps in same level (B—ocean, F—lake/pond, A—positive view, C—bay front = +10%, D—canal, E—river, G—wooded, H—golf, L—greenbelt = +5% K—cul-de-sac, J—corner = no adjust I—corner lot/sound, N—negative = −5%) |
| TypeOfConstruction | ? |
| Foundation | ? |
| YearBuilt | use only if no effective year built w * (Age_comp-Age_subject) * (SalePrice_comp/1000) if (Age_subject + Age_comp)/2 < 5 then w = 3.2 else if (Age_subject + Age_comp)/2 < 9 then w = 2.4 else if (Age_subject + Age_comp)/2 < 12 then w = 1.6 else if (Age_subject + Age_comp)/2 < 20 then w = .8 else w = .4 max of 10% of salePrice |
| EffectiveYearBuilt | w * (Age_comp-Age_subject) * (SalePrice_comp/1000) if (Age_subject + Age_comp)/2 < 4 then w = 4 |

|   | -continued |
|---|---|
|   | else if (Age_subject + Age_comp)/2 < 6 then w = 3 else if (Age_subject + Age_comp)/2 < 8 then w = 2 else if (Age_subject + Age_comp)/2 < 15 then w = 1 else w = .5 max of 10% of salePrice Quality(.02 * sale price) for each level of difference (Luxury > Excellent > Good > Average > Fair > Poor) Condition (.02 * sale price) for each level of difference (Excellent > Good > Average > Fair > Poor) |
| AirCondition | (.01 * sale price) for each level of difference (Central > Evaporative, Heat pump, waLl, Yes, Z—chill water > None, Office only, Partial, Window,) |
| Heating | (.01 * sale price) for each level of difference (Z—Central, B—forced air > A—gravity, C—floor furnace, D—wall furnace, E—hot water, F—ele bboard, G—heat pump, H—steam, I—radiant, J—space heater, K—solar, Y—yes > L—none, P—partial) |
| ParkingType | ? |
| BasementArea | if not finished ¼ to ½ value of living area if finished ½ to 1 value of living area |
| RoofType | ? |
| RoofCover | ? |
| Frame | ? |
| GargageCarportSqFt | ? |
| latitude | none |
| longitude | none |

These adjustment rules are then applied to the comparable properties selected at 40 in order to adjust for the value of the subject property. Instead of applying all of the above adjustment rules, time can be saved by only applying several of the adjustment rules deemed to be more important than the others, such as the adjustment rules for the attributes of fireplaces, a pool, the effective age of the property, quality of the property, and condition of the property.

An example of an adjustment for a comparable property is provided in Table 6. In the example provided in Table 6, the comparable property has a sale price of $175,000 dollars. However, the comparable property has a building area of 1800 square feet, while the subject property has a building area of 2000. Using the adjustment rules for the attribute building area, the price of the comparable is adjusted by $5450 (i.e., 22+(175000 * 0.00003)=$27.25 per square foot which is (200* $27.25=$5450)). Also, the price of the comparable is adjusted for the lot area since the comparable has a larger lot size. In Table 6, the lot area attribute is adjusted by $1/sq ft for a total of −$5000. Since the comparable has two bathrooms and the subject property has two and a half bathrooms, the price needs to be adjusted by using the rules provided in Table 4, which turns out to be $2000. There are no adjustments necessary for the bedroom attribute because both the subject property and the comparable property have the same number of bedrooms. Since the comparable does not have a fireplace and the subject property has one, the price needs to be adjusted accordingly. Using the adjustment rule for fireplaces, the price is adjusted $2000. If the adjustment rules are used for the effective year, quality, condition, and pool attributes for the subject and comparable property, the rules will generate an adjustment of $2800, $3500, $0, and $10,000, respectively. All of the adjustments are then summed with the sale price of the comparable property to arrive at the adjusted price. In Table 6, the adjusted price of the comparable property is $195,750.

TABLE 6

Example of an Adjustment

| Attribute | Subject | Comparable | Adjustment |
|---|---|---|---|
| SalePrice | ? | 175000 | 175000 |
| BuildingArea | 2000 | 1800 | 5450 |
| LotArea | 20000 | 25000 | −5000 |
| SFRTotalBaths | 2.5 | 2 | 2000 |
| SFRBedrooms | 3 | 3 |  |
| SFRFireplaces | 1 | 0 | 2000 |
| EffYearBuilt | 93 | 89 | 2800 |
| Quality | Good | Average | 3500 |
| Condition | Average | Average |  |
| Pool | Yes | No | 10000 |
|  |  |  | 195750 |

Referring again to FIG. 3, after all of the adjustments are applied to the sales price of the comparable properties, another set of comparable properties that more closely match the subject property are extracted at 48. In the illustrative embodiment, 4–8 comparables are selected at 48. If less than four comparables are selected, then the comparables may not correctly reflect the market and if more than eight comparables are used, then some of the comparables may not be similar enough to the subject property.

The best (i.e., four to eight) of the remaining adjusted comparable properties are selected by sorting the comparables according to their adjusted prices in the manner as shown in Table 7. The comparables with the highest adjusted price are placed at the top and ranked in descending order. The third column in table 7 represents the difference between the adjusted price of the comparable and the specified price of the subject. The four to eight properties with the smallest difference are selected as the final set of comparables.

TABLE 7

Selection of the best Comparables

| Property | Adjusted Price | Difference |
|---|---|---|
| 342–837 | 214400 | 14400 |
| 113–012 | 204500 | 4500 |
| 306–018 | 201400 | 1400 |
| 093–018 | 200600 | 600 |
| 305–006 | 200400 | 400 |
| 685–046 | 200200 | 200 |
| 847–984 | 199750 | 250 |
| 873–005 | 199600 | 400 |
| 431–023 | 199000 | 1000 |
| 331–018 | 197000 | 3000 |

Referring again to FIG. 3, after the best of the adjusted comparables have been selected, the adjusted prices of the selected comparables are aggregated into an estimate price of the subject property at 50. The aggregated estimated price is determined by multiplying the adjusted price of the comparable properties to their respective measurement of similarity and summed together to generate a total weighted price. Next, the total weighted price is divided by the total of the similarity measurements for the comparable properties. The result is an estimate price of the subject property. An example of the aggregation for comparables is provided in Table 8. In this example, the total weighted price is $757,640 and the total similarity score is 3.83. Thus, dividing $757,640 by 3.83 results in an estimate price of 199,900 for the subject property.

TABLE 8

Comparable Aggregation

| Comparable | Adjusted Price | Score | Weighted Price |
|---|---|---|---|
| 113–012 | 197000 | 0.95 | 187150 |
| 306–008 | 202000 | 0.88 | 177760 |
| 093–011 | 196500 | 0.78 | 153270 |
| 685–046 | 192000 | 0.64 | 122880 |
| 847–984 | 201000 | 0.58 | 116580 |
| total |  | 3.83 | 757640 |
| final estimate = 757640/3.83 = |  |  | 199900 |

After producing the final estimate of the value of the subject property, the estimate is compared against the specified price for validation at 52. A measurement of confidence indicating the reliability of the validation is then generated at 54. In particular, the confidence measurement in the estimate can be obtained by averaging the similarity scores of the comparables in the final selection, or by averaging the number of comparables over a threshold in the primary retrieval. The estimate is justified by displaying the comparables in enough detail so that they can be shown to be similar to the specified price of the subject.

It is therefore apparent that there has been provided in accordance with this invention, a method for validating the price of a real estate subject property based on a specified price that fully satisfy the aims and advantages and objectives hereinbefore set forth. The invention has been described with reference to several embodiments, however, it will be appreciated that variations and modifications can be effected by a person of ordinary skill in the art without departing from the scope of the invention. For example, the present invention can be used to validate the estimated price generated by a conventional estimator.

What is claimed is:

1. A computer-implemented method for validating a specified price of a subject property, comprising:

retrieving a set of real estate properties comparable to the subject property from a case base, the comparable properties and the subject property characterized by a plurality of common attributes each having a respective value;

evaluating each attribute value from the set of comparable properties to the same attribute value of the subject property on a fuzzy preference scale indicating desirable and tolerable deviations from an ideal match with the subject property, each evaluation generating a preference vector having a value between 0 and 1;

determining a measurement of similarity between each comparable property and the subject property;

examining additional attributes characterizing the comparable properties with the subject property;

determining differences between the additional attributes characterizing each of the comparable properties and the subject property;

applying a plurality of adjustment rules from an adjustment rule database to the differences between each of the comparable properties and the subject property, the plurality of adjustment rules adjusting the price of the comparable properties by either decreasing the price of each comparable property if the comparable property has differences in the additional characteristics that are superior in value to the subject property or increasing the price of each comparable property if the comparable property has differences in additional characteristics that are inferior in value to the subject property;

extracting the adjusted comparable properties according to a predetermined threshold;

sorting and ranking the adjusted comparable properties according to similarity with the specified price;

extracting the sorted and ranked comparable properties;

aggregating the extracted comparable properties into an estimate price of the subject property; and comparing the estimate price of the subject property to the specified price and generating a measurement of confidence validating the reliability of the specified sale price.

2. The computer-implemented method according to claim 1, further comprising filtering the set of comparable properties to obtain a smaller set of comparable properties.

3. The computer-implemented method according to claim 1, wherein the plurality of common attributes comprise date of sale, distance to each other, sale price, living area, lot size, number of bedrooms, and number of bathrooms.

4. The computer-implemented method according to claim 1, determining a measurement of similarity comprises providing a predetermined weight to each attribute, multiplying the predetermined weight by the preference vector for each attribute to generate a weighted preference value, and summing each of the weighted preference values to provide a measurement of similarity.

5. The computer-implemented method according to claim 1, wherein the additional characteristics comprise fireplaces, a pool, effective age of the property, quality of the property, and condition of the property.

6. The computer-implemented method according to claim 1 wherein the aggregating comprises multiplying the adjusted price of the comparable properties to their respective measurement of similarity to generate a weighted price, summing the weighted prices for all of the comparable properties to generate a total weighted price, summing the measurements of similarities from the comparable properties to generate a total measurement of similarity, dividing the total weighted price by the total measurement of similarity to generate the estimate price value of the subject property.

* * * * *